United States Patent Office 3,535,283
Patented Oct. 20, 1970

3,535,283
PROCESS FOR THE POLYMERIZATION OF ALDEHYDES
Henricus Gerardus Josef Overmars, Zeist, and Jan Gerrit Noltes, Bunnik, Utrecht, Netherlands, assignors to International Lead Zinc Research Organization, Inc., New York, N.Y., a membership corporation of New York
No Drawing. Filed Jan. 8, 1968, Ser. No. 696,111
Claims priority, application Netherlands, Mar. 14, 1967, 6703805
Int. Cl. C08g 1/06, 1/10
U.S. Cl. 260—67          15 Claims

ABSTRACT OF THE DISCLOSURE

A process for polymerizing aldehydes, particularly acetaldehyde, using a mixture of diarylzinc and N-arylamide as a catalyst.

---

This invention relates to a process for the polymerization of aldehydes, and more particularly to a process for preparing polyaldehydes using a mixture of diarylzinc and N-arylamide as a catalyst.

The known methods for polymerizing aldehydes, especially acetaldehyde, are time-consuming and uneconomical. The use of dialkylzinc alone as a catalyst results in a relatively low yield.

It is therefore an object of this invention to provide a process for preparing polymers and copolymers of aldehydes at higher yields and with less expense.

It has been found that higher yields are obtained, especially in the polymerization of acetaldehyde or its derivatives, if a mixture of a diarylzinc and an N-arylamide with the general formula aryl-NH.CO.R is used a catalyst. Aryl represents a substituted or unsubstituted aryl radical, and R represents a substituted or unsubstituted hyrocarbon, but not a hydrogen.

According to the invention, the process for the polymerization of aldehydes under the influence of a catalyst has the characterizing feature that the catalyst consists of a mixture of a diarylzinc compound which may or may not be substituted and an N-arylamide which may or may not be substituted.

Diphenylzinc, di-orthotolylzinc, di-para-tolyzinc, di- alpha-naphthylzinc, di-beta-naphthylzinc or di-para-biphenylzinc may be used as dairylzinc. Diphenylzinc is to be preferred because it is the diarylzinc compound which is most readily available.

Examples of suitable compounds of the general formula Aryl-NH.CO.R are acetanilide, parachloroacetanilide, ortho-nitroacetanilide, ortho-acetotoluidide, meta-chloroacetotoluidide. Also suitable are the N-phenylamides of propionic, butyric, iso-butyric, valeric, capric, lauric, palmitic, stearic, ethylhexanoic acid, and of dicarboxylic acids such as succinic acid and homologues, as well as benzoic, paramethylbenzoic and halobenzoic acids, such as parachlorobenzoic acid, and of paranitrobenzoic and hydroxybenzoic acids such as salicylic acid and phenyl-substituted derivatives of the above.

Generally speaking, the catalyst mixture comprises about equal numbers of moles of N-arylamide and of diarylzinc, but the accuracy of the measurement is not of great importance. About 0.0001 to 0.02 gram-mole of N-arylamide and about 0.0001 to 0.02 gram-mole of diarylzinc are mixed as catalyst per gram-mole of aldehyde starting substance. If relatively little N-arylamide is used, e.g., ½ mole per mole of diarylzinc compound, the yield of product will decrease.

When using this catalyst system the yield in aldehyde polymer approximates 65% to 80% weight of the monomer used. If under otherwise equal conditions no catalyst mixture or exclusively the carboxylic acid amide component is added, there will be no polymerization. If exclusively diarylzinc is used, the yield in polyacetaldehyde, for example, will amount to at most 30% calculated on the monomeric acetaldehyde.

Not only its high yield in polymer, but also its stereoregularity and its high molecular weight are characteristic features of the polymer produced by this catalyst system. The polymer therefore shows a high degree of crystallinity. The crystallinity is usually determined by extracting the polymer with a suitable solvent. Thus, for instance, methanol or acetone may be used to dissolve the amorphous portion. The percentage of the loss of weight through extraction is a measure of the crystallinity of the polymer. The most important condition is the use of the same extracting agent when mutual comparisons are conducted. The polymers obtained according to the invention using the methanol extraction generally have a crystallinity of at least 95%.

The use of solvents in the process is not absolutely necessary, but the presence of solvents results in most instances in higher yields than are obtainable in the absence of solvent. Suitable solvents are aliphatic, aromatic and cyclo-aliphatic hydrocarbons which may or may not be substituted and which have a melting point below 50° C. For example a simple and effective solvent is toluene.

The process of polymerization according to the invention is generally carried out at low or very low temperatures. In connection with the moisture sensitivity and the oxygen sensitivity of the catalyst system, it is preferred to work under anhydrous and anaerobic conditions. After the polymerization has been completed, the catalyst may be decomposed by the addition of methanol.

The drying of vessels and chemicals is effected according to known techniques, as are also the expulsion and exclusion of oxygen. In the following examples these conditions have been fulfilled. All activities up to and including the polymerization step were carried out in a dry nitrogen atmosphere.

The following examples are intended to illustrate the process of the invention and should not be construed as limiting in any way the scope of the invention.

EXAMPLE I 0.01 mole of diphenyl zinc and 0.01 mole of parachloro acetanilide in 650 ml. of dry toluene were brought together with 2 moles of dry acetaldehyde at −78° C. and under an absolutely dry nitrogen atmosphere. The mixture was kept at −78° C. with solid carbon dioxide acetone. After that, the mixture was brought to room temperature, 25 ml. of dry methanol was added and the polymeric gel was crushed, filtered off, washed with methanol and dried at the air. After extraction with methanol, there remained 62 grams of a snow-white polymeric powder with a yield of 70%.

EXAMPLE II 0.006 mole of diphenylzinc and 0.0006 mole of acetanilide in 650 ml. of dry toluene were brought together with 2 moles of dry acetaldehyde under an absolutely dry nitrogen atmosphere at −78° C. The further processing was conducted according to Example I. 61 grams of a polyacetaldehyde powder were obtained with a yield of 69%.

EXAMPLE III 0.008 mole of diphenylzinc and 0.008 mole of ortho-acetotoluidide in 650 ml. of dry toluene and 2 moles of dry acetaldehyde were processed as according to Example I. 70 grams of polyacetaldehyde were obtained with a yield of 80%.

EXAMPLE IV

The Examples I, II and III were repeated with 3 different molar quantities of acetaldehyde in diphenylzinc and N-phenylamide, i.e., 0.001:0.001 mole, 0.01:0.01, and 0.1:0.1 mole, respectively, of diphenylzinc:N-phenylamide per mole of reacted acetaldehyde. In the last instance difficulties occurred in the process. In the first and second cases on the other hand, the results were on the order of 60–80% polymer, calculated on the amount of acetaldehyde introduced. 92% to 95% of the polymer product was methanol-insoluble.

The reason that the smallest possible quantities of catalyst system are not used is of a purely practical nature. Working with very low concentrations requires a high degree of accuracy and absence of moisture and oxygen. The arrangements necessary for this purpose was uneconomical, since the catalyst system in itself is inexpensive.

The variations in time are of no importance. In certain cases, e.g., Example III, after extraction with chloroform and after 6, 12, 24 and 48 hours, the yield was 59%, 69%, 72% and 73% respectively.

The concentration of the substances in the solvent, which according to the examples amounted to about 6 parts by weight of toluene per part by weight of aldehyde, is also unimportant. It is even possible to work entirely without a solvent, when a low-melting aldehyde such as acetaldehyde is employed. This is not a preferred manner of processing, however, since the amount of free liquid is reduced by the progress of polymerization, which entails the risk of an nonhomogeneous distribution of the catalyst system. Excessive use of solvent does not affect the reaction, but it is uneconomical.

At room temperature the reaction with acetaldehyde does not proceed, because the polymerization requires a low temperature. The temperature mentioned in the examples need not be quite so low. At $-40°$ C., for instance, a reaction will occur, but $-78°$ C. is the well-known temperature which can easily be reached and maintained by using solid carbon dioxide with acetone.

EXAMPLE V

As in Example I, 0.01 mole of diphenylzinc and 0.01 mole of the N-phenylamide of propionic acid in 650 ml. of dry n-hexane were brought together with 2 moles of acetaldehyde. After further processing, 60 grams of polyacetaldehyde were obtained. Yield was 69%.

EXAMPLE VI

As in Example I, 0.01 mole of di-beta-naphthylzinc and 0.015 mole of N-phenylzinc acetamide were brought together with 2 moles of acetaldehyde in 650 ml. of dry toluene. 65 grams of polyacetaldehyde were obtained for a yield of 75%.

EXAMPLE VII

As in Example V, 0.01 mole of diphenylzinc and 0.008 mole of N-arylphenylamide in 650 ml. of dry toluene were brought together with 2 moles of acetaldehyde. After further processing, 56 grams of polyacetaldehyde were obtained for a yield of 65%.

EXAMPLE VIII

As in Example V, 0.01 mole of diphenylzinc and 0.015 mole of N-phenyl-paramethyl-benzamide were brought together with 2 moles of acetaldehyde in 650 ml. of dry n-hexane for a yield of 54 grams or 63%.

EXAMPLE IX 0.006 mole of diparatolylzinc and 0.006 mole of parachloro acetanilide were brought together with 0.5 mole of trichloro acetaldehyde in 140 ml. of dry toluene, under an absolutely dry nitrogen atmosphere. Cooling was effected at $-78°$ C. After 24 hours the mixture was brought to room temperature and 10 ml. of methanol was added. The polymer was filtered off, crushed, washed with methanol, dried at the air and thoroughly extracted with methanol. 33 grams of polytrichloro acetaldehyde were obtained.

EXAMPLE X

As according to Example I, 0.002 mole of diparatolylzinc and 0.002 mole of orthoacetotoluidide were brought together with 1.5 moles of propionaldehyde in 300 ml. of dry toluene. The reaction was effected during 24 hours at $-78°$ C. After processing as set forth in Example I, 49 grams of polypropionaldehyde resulted.

EXAMPLE XI

Example I was followed with 0.002 mole of diphenylzinc and 0.002 mole of acetanilide in 300 ml. of dry toluene with 1.2 moles of butyraldehyde. The yield after processing was 57 grams of polybutyraldehyde.

EXAMPLE XII

Example I was followed with 0.01 mole of diparatolylzinc and 0.01 mole of parachloroacetanilide in 650 ml. of dry toluene with 1.6 moles of acetaldehyde and 0.4 mole of dichloroacetaldehyde. The yield after processing was 48 grams of the copolymer with high crystallinity.

We claim:

1. In a process for polymerization of a saturated, aliphatic aldehyde which may contain chlorine atoms to form an aldehyde polymer, the improvement which comprises forming a mixture of (1) approximately 0.0001 to 0.02 gram-mole of a di-(mono- or dicarbocyclicaryl)zince and (2) approximately 0.001 to 0.02 gram-mole of an N-arylamide having the formula, Ar—NH.CO. R wherein Ar represents an unsubstituted or substituted monocarbocyclicaryl radical, with the substituted monocarbocyclicaryl containing at least one radical selected from the group consisting of halide, nitro and lower alkyl radicals, and R represents a radical selected from the group consisting of unsubstituted or substituted alkyl and monocarbocyclicaryl radicals, with the substituted radical containing at least one radical selected from the group consisting of halide, hydroxy, phenyl, lower alkyl and nitro radicals, and subsequently contacting said mixture with approximately one gram-mole of at least one of said aldehydes at a temperature below $-40°$ C. to form an aldehyde polymer.

2. A process according to claim 1, wherein diphenylzinc is used as the di-monocarbocyclicarylzinc compound.

3. A process according to claim 1, wherein ditolylzinc is used as the di-monocarbocyclicarylzinc compound.

4. A process according to claim 1, wherein the N-aryl amide is N-phenylamide.

5. A process according to claim 1, wherein the N-arylamide is parachloroacetanilide.

6. A process according to claim 1, wherein the N-arylamide is acetanilide.

7. A process according to claim 1, wherein the N-arylamide is ortho-acetotoluidide.

8. A process according to claim 1, wherein the aldehyde to be polymerized is acetaldehyde.

9. A process according to claim 1, wherein the aldehyde to be polymerized is propionaldehyde.

10. A process according to claim 1, wherein the aldehyde to be polymerized is butyraldehyde.

11. A process according to claim 1, wherein the aldehyde to be polymerized is trichloroacetaldehyde.

12. A process according to claim 1, wherein acetaldehyde and dichloro acetaldehyde are copolymerized.

13. A process according to claim 1, wherein polymerization is effected in an aliphatic, aromatic and cycloaliphatic hydrocarbon solvent.

14. A process as set forth in claim 1, wherein the amount of di-(mono- or dicarbocyclicaryl)zinc and the amount of N-arylamide are approximately equimolar.

15. A process as set forth in claim 1, wherein the temperature of the reaction is approximately −78°.

References Cited

UNITED STATES PATENTS

| | | | |
|---|---|---|---|
| 2,848,437 | 8/1958 | Langsdorf et al. | 260—67 |
| 3,305,530 | 2/1967 | Warren | 260—67 |

WILLIAM SHORT, Primary Examiner

L. M. PHYNES, Assistant Examiner